(12) United States Patent
Breznak et al.

(10) Patent No.: US 7,216,796 B2
(45) Date of Patent: *May 15, 2007

(54) CREVICE CORROSION-RESISTANT LIQUID-COOLED ARMATURE BAR CLIP-TO-STRAND CONNECTION AND RELATED METHOD

(75) Inventors: Jeffrey M. Breznak, Waterford, NY (US); Alan Michael Iversen, Clifton Park, NY (US); James Fredrick Hopeck, Mechanicville, NY (US)

(73) Assignee: General Electric, Company, Schenectady, NY (US)

( * ) Notice: Subject to any disclaimer, the term of this patent is extended or adjusted under 35 U.S.C. 154(b) by 354 days.

This patent is subject to a terminal disclaimer.

(21) Appl. No.: 10/841,964

(22) Filed: May 10, 2004

(65) Prior Publication Data

US 2005/0247762 A1  Nov. 10, 2005

(51) Int. Cl.
*B23K 35/12* (2006.01)
(52) U.S. Cl. .......................... 228/245; 29/596
(58) Field of Classification Search ............ 228/245, 228/246, 249, 132, 133, 212, 179.1, 178; 310/52, 53, 54; 219/129, 85.13, 85.1, 85.21, 219/85.22, 85.15; 29/596
See application file for complete search history.

(56) References Cited

U.S. PATENT DOCUMENTS

| | | | |
|---|---|---|---|
| 2,686,957 A * | 8/1954 | Koerper | 29/890.044 |
| 3,693,036 A | 9/1972 | Schmitt | |
| 3,930,306 A * | 1/1976 | Goldberg et al. | 29/854 |
| 4,066,203 A | 1/1978 | Davies | |
| 4,199,700 A | 4/1980 | Daugherty et al. | |
| 4,380,362 A | 4/1983 | Swensrud et al. | |
| 4,385,254 A | 5/1983 | Vakser et al. | |
| 4,894,575 A | 1/1990 | Nilsson et al. | |
| 5,066,456 A * | 11/1991 | Ballentine et al. | 420/472 |
| 5,557,837 A * | 9/1996 | Thiard-Laforet et al. | 29/596 |
| 5,581,869 A * | 12/1996 | Travaly | 29/596 |
| 5,605,590 A | 2/1997 | Manning et al. | |
| 5,717,267 A | 2/1998 | Paroz | |
| 5,760,371 A * | 6/1998 | Dailey et al. | 219/129 |
| 5,791,924 A | 8/1998 | Taillon et al. | |

(Continued)

OTHER PUBLICATIONS

Breznak et al., U.S. Appl. No. 10/991,371, filed Nov. 19, 2004.

(Continued)

*Primary Examiner*—Patrick Joseph Ryan
*Assistant Examiner*—Michael Aboagye
(74) *Attorney, Agent, or Firm*—Nixon & Vanderhye, P.C.

(57) ABSTRACT

A brazed joint between an armature bar strand package and an end fitting includes a plurality of strands arranged in a tiered array and forming the strand package; a cavity in the end fitting, free ends of the plurality of strands extending through opening in the end fitting and received in the cavity; and an essentially phosphorous-free copper-silver braze alloy joining the free ends of the plurality of strands to each other and to interior surfaces of the end fitting.

20 Claims, 4 Drawing Sheets

U.S. PATENT DOCUMENTS

| | | | |
|---|---|---|---|
| 5,796,189 A * | 8/1998 | Manning et al. ............. | 310/54 |
| 5,809,632 A | 9/1998 | Champagne et al. | |
| 5,875,539 A | 3/1999 | Kilpatrick et al. | |
| 6,577,038 B2 * | 6/2003 | Butman et al. ............. | 310/201 |
| 6,784,573 B1 * | 8/2004 | Iversen et al. ............... | 310/52 |
| 2002/0079773 A1 | 6/2002 | Butman et al. | |
| 2005/0249629 A1 * | 11/2005 | Harris ....................... | 420/472 |
| 2006/0108401 A1 * | 5/2006 | Breznak et al. ............. | 228/244 |

OTHER PUBLICATIONS

U.S. Appl. No. 10/418,296, filed Apr. 18, 2003, entitled "Corrosion-Resistant Liquid-Cooled Armature Bar Clip-to-Strand Connection and Related Method."

* cited by examiner

CREVICE CORROSION-RESISTANT LIQUID-COOLED ARMATURE BAR CLIP-TO-STRAND CONNECTION AND RELATED METHOD

BACKGROUND OF THE INVENTION

This invention relates generally to the manufacture of generators and, specifically, to improving the joint between a hydraulic header clip or fitting and a liquid cooled armature bar.

The armature windings of large steam-turbine generators are generally water-cooled. The armature windings are composed of half coils or armature bars connected at each end through copper or stainless steel fittings and water-cooled connection rings to form continuous hydraulic circuits. The hydraulic winding circuits are typically connected to inlet and outlet water manifolds with plastic hoses that provide electrical isolation. The manifolds are connected to the stator water cooling system which cools, filters and deionizes the water and pumps the water back to the armature winding. The armature bars are composed of rectangular copper strands arranged in rectangular bundles. All of the strands may be hollow, or the bundle may include a mixture of solid and hollow strands. The hollow stands thus have a duct for conducting cooling water. A braze alloy joins the strands to each other and to a waterbox header clip at each end of one of the armature bars. The clip functions to deliver water to and collect water from the hollow strands. The clip is connected through copper or stainless steel fittings to a second armature bar to form a complete armature coil element of the winding.

The braze joints between the strands and between the strands and the clip must retain hydraulic and electrical integrity for the expected lifetime of the winding. The braze alloy or filler metal that joins the strands and the strands to the clip is currently a self-fluxing copper-phosphorous alloy, also referred to as a BCuP alloy. This family of alloys typically contains 3½–7 weight percent phosphorous. The surface of the braze joint is constantly exposed to a deionized, oxygenated water environment.

It has become evident that the factors required to support a crevice corrosion mechanism in a clip-to-strand braze joint are phosphorous, copper, suitable corrosion initiation sites and water. If any one of these factors are eliminated, crevice corrosion should not occur. Corrosion of the phosphorous-containing braze alloy and adjoining copper strand surfaces can occur under certain conditions, specifically if critical crevice geometry and crevice water chemistry requirements are met. The corrosion process can initiate if the joint surface contains any surface crevices, pinholes, or porosity at or near the surface of the joint, and if the critical water chemistry conditions that can support corrosion develops within these sites. The corrosion process can progress through the braze joint as long as critical crevice geometry and water chemistry conditions exist. In addition, porosity within the braze joint can accelerate the total apparent corrosion rate. Eventually, the path of corrosion can result in a water leak through the entire effective braze joint length, compromising the hydraulic integrity of the clip-to-strand joint.

U.S. Pat. No. 5,796,189 discloses an arrangement where all of the strands are cut to the same length and the copper-phosphorous (BCuP) braze alloy is pre-placed flush to the ends of the strands. A braze alloy anti-wetting agent is used on the ends of the hollow strands to prevent plugging of the hollow strands and an inert purge gas is used during the brazing cycle. Use of the anti-wetting agent, although effective for preventing hollow strand plugging, can result in strand faying surface contamination and a poor effective braze joint length.

A recent pending and commonly owned patent application Ser. No. 10/418,296 filed Apr. 18, 2003, teaches the use of extended hollow strands in combination with the use of a de-oxidizing gas as the purge gas. The extended hollow strands eliminate the need to use an anti-wetting agent on the ends of the hollow strands and the de-oxidizing purge gas limits oxidation during the brazing cycle, de-oxidizes strand surfaces and the braze alloy prior to alloy melting, and improves braze alloy wetting and flow. However, this practice continues the use of a phosphorous-containing braze alloy and, therefore, the potential for crevice corrosion still exists, although it is greatly minimized due to the significant reduction, or the elimination in most cases, of surface initiation sites.

BRIEF DESCRIPTION OF THE INVENTION

This invention relates to a brazed connection of a liquid-cooled armature bar strand package to a hydraulic header clip that is not susceptible to crevice corrosion initiation, and a related method for manufacturing the connection.

Generally, the invention provides a non-crevice-corroding clip-to-strand braze joint using a braze alloy that is essentially phosphorous-free, one of the key factors of the known crevice corrosion mechanism. A braze alloy that is essentially phosphorous-free has a phosphorous content that is sufficiently low enough such that phosphorous-containing metallurgical phases that are susceptible to crevice corrosion cannot form. Generally, and for purposes of this discussion, alloys with less than 500 ppm (or 0.05 weight percent) phosphorous are considered essentially phosphorous-free. The benefits are expected to be improved generator availability and reliability.

Specifically, the invention employs extended hollow strands (relative to the solid strands) to avoid the need for a braze alloy anti-wetting agent on the ends of the hollow strands. Strips of a rolled, essentially phosphorous-free, copper-silver braze alloy are placed between the tiers of strands and between the strands and the internal surfaces of the header clip. Additional metal shims composed of copper or other suitable metal may be placed between the tiers to aid braze alloy retention. To further aid braze alloy retention, a temporary refractory sleeve may be placed around the strand package at the strand-to-clip interface and a spring-loaded chill clamp is used. The joint is brazed in a chamber under a controlled gas atmosphere to avoid the need for brazing fluxes. Optionally, a stick-form of the copper-silver alloy can be used to add additional filler metal to the braze joint during the brazing process.

The braze joint can be made with the axis of the armature bar in either a horizontal or a vertical orientation. The vertical orientation is preferred, however, because it aids alloy retention in the joint and permits pieces of the alloy to be more easily pre-placed on the surface of the assembly inside the hydraulic header clip, thereby providing a source of additional filler metal that will melt and flow over the surface to create a thicker layer of filler metal than would be possible with the armature bar in a horizontal orientation.

The copper-silver alloy can contain one or more other elements, such as tin, zinc or nickel, that can result in solidus and liquidus modifications to suit specific applications. In a less preferred embodiment of the manufacturing method, the brazement may be made in an atmosphere of air or an inert gas such as nitrogen or argon, along with the use of brazing fluxes when it is desirable to avoid brazing in a chamber with a controlled atmosphere.

Accordingly, in one aspect, the invention relates to a brazed joint between an armature bar strand package and an end fitting comprising a plurality of solid strands and a plurality of hollow strands arranged in a tiered array and forming the strand package, the plurality of hollow strands having free ends that extend axially beyond corresponding free ends of the solid strands; a cavity in the end fitting, the free ends of the plurality of hollow strands and the corresponding free ends of the solid strands extending through the opening and received in the cavity; and an essentially phosphorous-free copper-silver braze alloy joining the free ends of the plurality of hollow strands and the corresponding free ends of the plurality of solid strands to each other and to interior surfaces of the end fitting.

In another aspect, the invention relates to a brazed joint between an armature bar and an end fitting comprising a cavity in the end fitting, accessed by an opening; an array of solid and hollow strands received in the opening and arranged in a tiered array; and an essentially phosphorous-free, copper-silver braze alloy joining the solid and hollow strands to each other and to internal surfaces of the end fitting, the braze alloy covering free ends of the solid strands but leaving free ends of the hollow strands open and unobstructed.

In still another aspect, the invention relates to a method of forming a brazed joint between an armature bar and an end fitting comprising: a) locating ends of a plurality of hollow strands and a plurality of solid strands within a cavity in an end fitting such that free ends of the hollow strands extend axially beyond free ends of the solid strands; and b) pre-placing an essentially phosphorous-free copper-silver braze alloy around and between the ends of the hollow strands and the solid strands such that the braze alloy does not extend axially beyond the free ends of the hollow strands.

In still another aspect, the invention relates to a brazed joint between an armature bar strand package and an end fitting comprising a plurality of strands arranged in a tiered array and forming the strand package; a cavity in the end fitting, the free ends of the plurality of strands extending through the opening and received in the cavity; and an essentially phosphorous-free copper-silver braze alloy joining the free ends of the plurality of strands to each other and to interior surfaces of the end fitting.

DETAILED DESCRIPTION OF THE INVENTION

Figure 1:
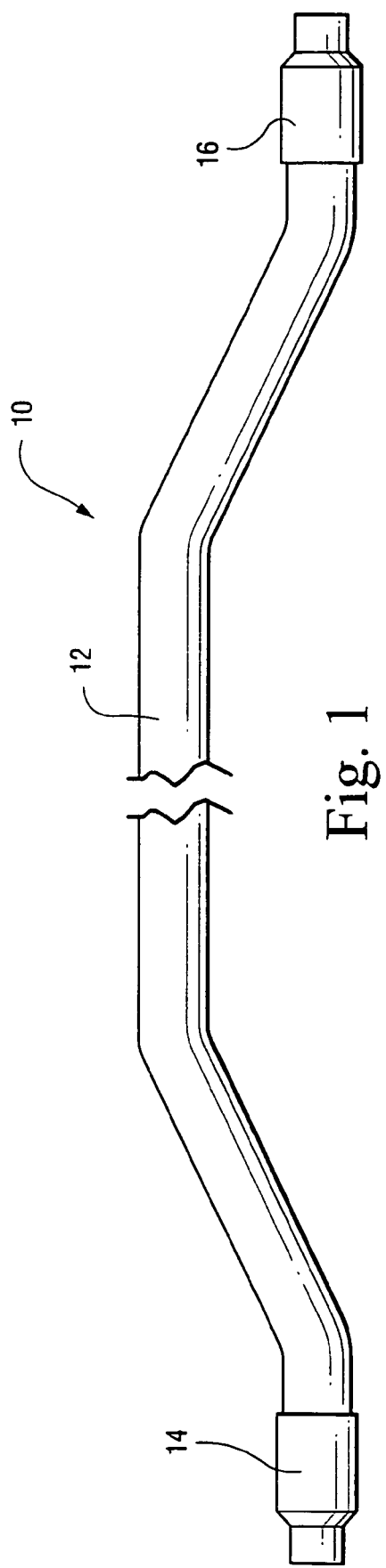
FIG. 1 is a side elevation of an armature bar and header clip assembly.

Referring now to FIG. 1, a liquid-cooled stator winding used in a typical liquid-cooled generator includes a plurality of armature bars 10 (one shown), the center portion 12 of which is adapted to pass through radially extending slots in a stator core (not shown), terminating at opposite ends in hydraulic end fittings or header clips 14 and 16, respectively, typically formed of an electrically conductive material such as copper. Inlet hoses (not shown) connect the header clips 14, 16 to an inlet or outlet coolant header (also not shown).

Figure 2:
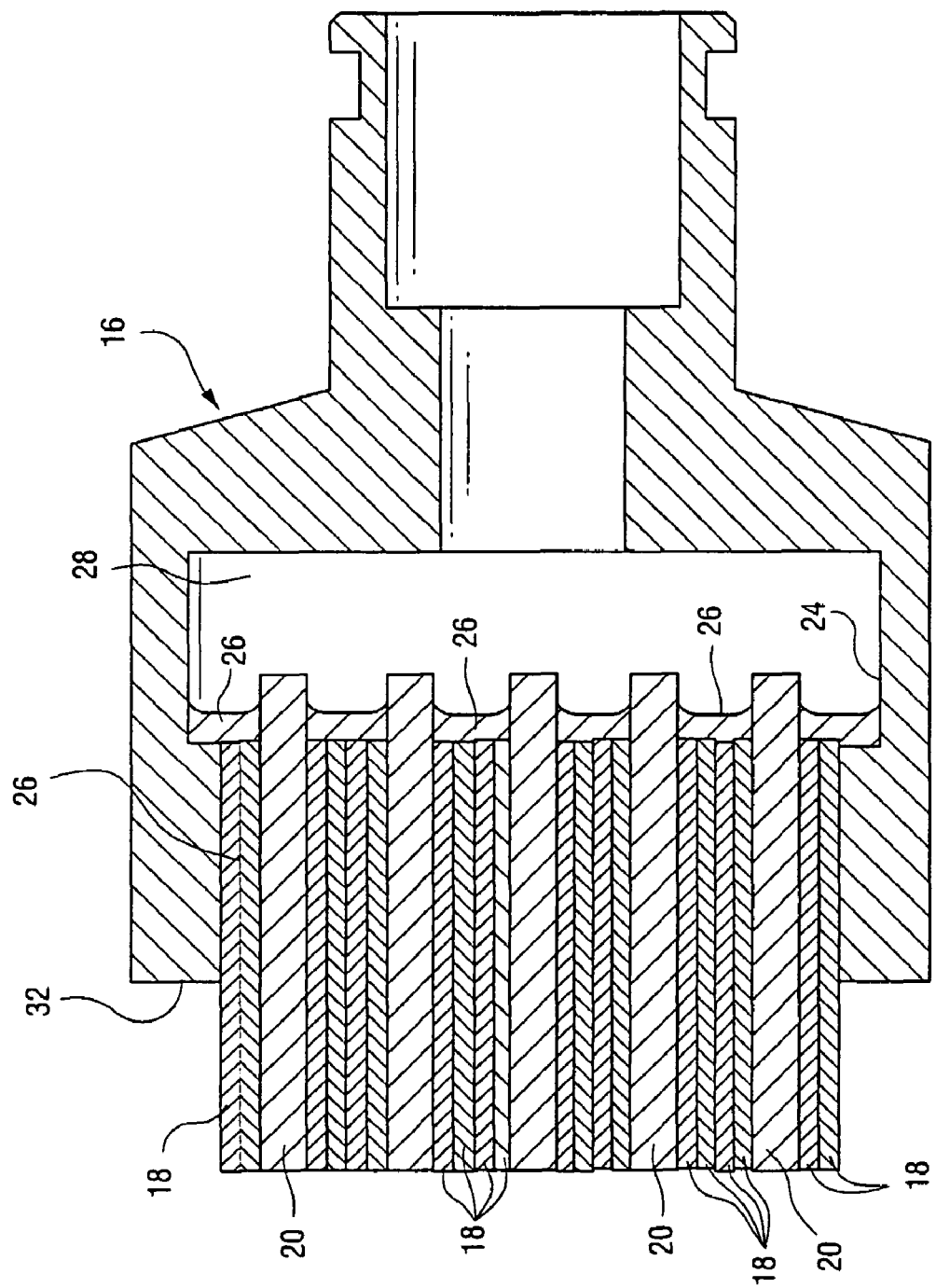
FIG. 2 is a side section, taken along the line 2—2 in FIG. 3, of a header clip-to-strand connection in accordance with an exemplary embodiment of the invention.

With reference also to FIG. 2, the armature bar 10 is composed of many small rectangular solid and hollow copper strands 18, 20, respectively (FIG. 2), that are brazed to the interior of the header clips 14, 16 as further described below. It will be appreciated that the strands 18, 20 may also be constructed of metals other than copper, such as copper-nickel alloys or stainless steel. Since the clips 16, 20 are identical, only clip 16 will be described in detail.

Figure 3:
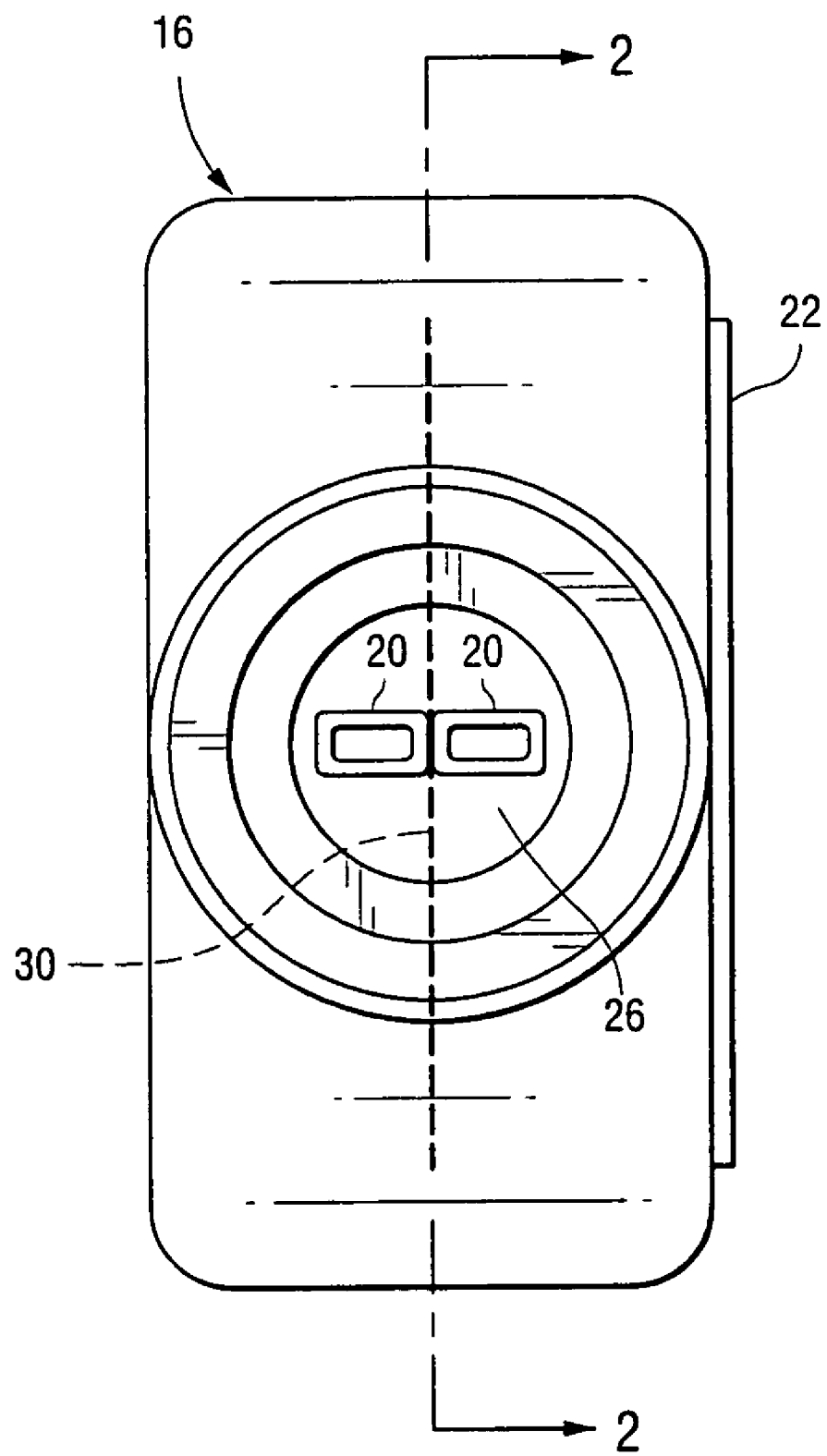
FIG. 3 is an end elevation of the connection shown in FIG. 2.

As best seen in FIGS. 2 and 3, the solid and hollow copper strands 18, 20 extend through an opening 21 in the end fitting, and are disposed in side-by-side and superposed relation one to the other, in a generally rectangular, multi-tier array. The array may be compressed within the hydraulic end fitting or header clip 16 by means of a side plug 22 (FIG. 3) fitted within a similarly shaped "window" cut-out of the header clip. The rows or tiers of strands 18, 20 within the stator bar are brazed to one another as well as to the interior surfaces 24 of the end fitting using a filler metal or braze alloy barrier coat 26. The braze alloy 26 preferably comprises an essentially phosphorous-free copper-silver alloy in rolled strip form. The latter facilitates placement of the alloy between the tiers of strands and between the strands and the internal surfaces of the end fitting or header clip.

The particular configuration of solid strands 18 and hollow strands 20 within the package may vary. For example, there may be a 1 to 1 ratio of solid strands to hollow strands, up to a ratio of, for example, 6 to 1 or more, depending on the capability of the bar design to remove heat during generator operation. Conversely, the package may contain all hollow strands. The arrangement of solid and hollow strands within the array may vary as well. Thus, while a two-tier array is shown in FIGS. 2 and 3, it will be appreciated that four and six or more tiers are possible.

The free ends of the hollow strands 20 extend axially beyond the corresponding free ends of the solid strands 18, projecting into an open cavity or manifold 28. The differential lengths of the solid and hollow strands may be achieved by any suitable means including the use of a specialized tool to shorten the solid strands. The filler metal or braze alloy 26 is pre-placed within the header clip 16 so as to surround the enclosed ends of the hollow and solid strands, but not to extend axially beyond the hollow strands 20. As best seen in FIG. 2, the braze alloy barrier coat 26 extends axially along and between all sides of each of the strands 18, 20 in the array, and also covers the ends (or faying surfaces) of the solid strands 18 while leaving the ends of the hollow strands 20 open and unobstructed for free flow of coolant through the hollow strands.

Figure 4:
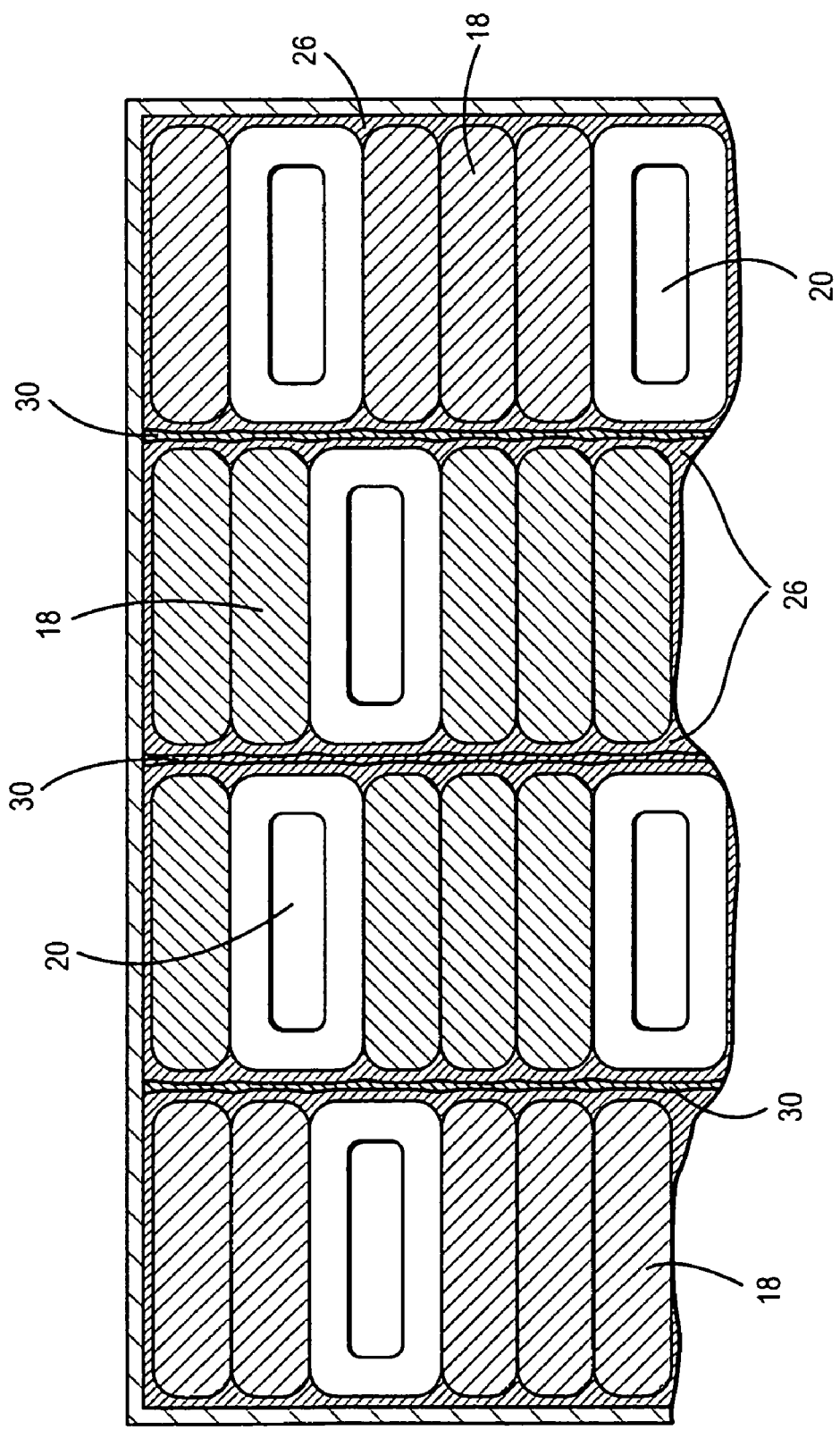
FIG. 4 is a partial end elevation of a clip-to strand connection with metal shims between the tiers.

With reference to FIG. 4, a multi-tier arrangement is illustrated showing how metal shims 30 composed of copper or other suitable metal may be placed between the tiers to aid braze alloy retention. These shims 30 extend axially to a location substantially flush with the back wall of the clip. A temporary refractory sleeve (not shown) may be placed around the strand package at the strand-to-clip interface. In addition, a spring-loaded chill clamp (not shown) may be used to further aid braze alloy retention. Specifically, the chill clamp would be applied about the strands just behind the clip 16 to establish a temperature differential between the strands inside the clip and the strands outside the clip. The temperature differential aids in containing the flow of braze alloy to areas inside the clip, i.e., it substantially prevents the escape of braze alloy along the strands beyond the back wall 32 of the clip. The joint assembly may be brazed in a controlled gas atmosphere (for example, a gas containing nitrogen, hydrogen and trace amounts of oxygen; or 100% hydrogen), in a chamber to avoid the need for a flux. If desired, a stick-form of the copper-silver alloy may be used to add additional filler material to the braze joint during the brazing process.

When heated to its melting temperature, the braze alloy 26 flows and fills in the spaces between the solid and hollow strands 18, 20 and between the strands and the interior surfaces 24 of the header clip, including at the opening of the header clip into which the strands are inserted. At its melting temperature, the alloy 26 remains sufficiently viscous that it does not flow substantially to the free ends of the hollow strands 20. In other words, the extended length of the hollow strands 20 provides a safety margin in that the excess alloy material will not flow out as far as the ends of the hollow strands, precluding the possibility of plugging the cooling passages in the hollow strands.

The braze joint can be made with the axis of the armature bar in a horizontal or a vertical orientation. The vertical orientation is preferred because it aids alloy retention in the joint and permits pieces of the alloy to be pre-placed on the surface of the assembly inside the hydraulic header clip, thereby providing a source of additional filler metal that will melt and flow over the surface resulting in a thicker layer of filler metal than would be possible with the armature bar in a horizontal orientation.

The essentially phosphorous-free copper-silver alloy can contain one or more other elements, such as tin, zinc or nickel, that can result in solidus and liquid modifications to suit the application. In a less preferred embodiment of the manufacturing method, the brazement may be made in an atmosphere of air or an inert gas, such as nitrogen or argon, with the use of brazing fluxes to avoid the need to braze in a chamber with a controlled atmosphere.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A brazed joint between an armature bar strand package and an end fitting comprising:
   a plurality of solid strands and a plurality of hollow strands arranged in a tiered array and forming the strand package, said plurality of hollow strands having free ends that extend axially beyond corresponding free ends of said solid strands;
   a cavity in the end fitting, said free ends of said plurality of hollow strands and said corresponding free ends of said solid strands extending through an opening in said end fitting and received in said cavity; and
   an essentially phosphorous-free copper-silver braze alloy joining said free ends of said plurality of hollow strands and said corresponding free ends of said plurality of solid strands to each other and to interior surfaces of said end fitting.

2. The brazed joint of claim 1 wherein said braze alloy covers said free ends of said solid strands.

3. The brazed joint of claim 1 further comprising metal shims arranged between one or more tiers of said tiered array.

4. The brazed joint of claim 3 wherein said metal shims are composed of copper.

5. The brazed joint of claim 1 wherein said plurality of solid and hollow strands are composed of copper.

6. The brazed joint of claim 1 wherein said plurality of solid strands are composed of copper and hollow strands are composed of stainless steel.

7. A brazed joint between an armature bar and an end fitting comprising:
   a cavity in the end fitting, accessed by an opening;
   an array of solid and hollow strands received in said opening and arranged in a tiered array; and
   an essentially phosphorous-free, copper-silver braze alloy joining said solid and hollow strands to each other and to internal surfaces of said end fitting, said braze alloy covering free ends of said solid strands but leaving free ends of said hollow strands open and unobstructed.

8. The brazed joint of claim 7 and further comprising metal shims arranged between one or more tiers of said tiered array.

9. The brazed joint of claim 8 wherein said metal shims are composed of copper.

10. The brazed joint of claim 7 wherein said plurality of solid and hollow strands are composed of copper.

11. The brazed joint of claim 7 wherein said plurality of solid strands are composed of copper and hollow strands are composed of stainless steel.

12. A method of forming a brazed joint between an armature bar and an end fitting comprising:
    a) locating ends of a plurality of hollow strands and a plurality of solid strands within a cavity in an end fitting such that free ends of said hollow strands extend axially beyond free ends of said solid strands; and
    b) pre-placing an essentially phosphorous-free copper-silver braze alloy around and between said ends of said hollow strands and said solid strands such that said braze alloy does not extend axially beyond said free ends of said solid strands.

13. The method of claim 12 and further comprising:
    c) brazing the plurality of hollow and solid strands to the end fitting within a chamber in a controlled gas atmosphere.

14. The method of claim 12 and further comprising adding metal shims between at least some of said tiers.

15. The method of claim 14 wherein said shims are composed of copper.

16. The brazed joint of claim 12 wherein said plurality of solid and hollow strands are composed of copper.

17. The brazed joint of claim 12 wherein said plurality of solid strands are composed of copper and hollow strands are composed of stainless steel.

18. The method of claim 13 wherein said gas comprises nitrogen, hydrogen and trace amounts of oxygen or 100% hydrogen.

19. A brazed joint between an armature bar strand package and an end fitting comprising:
    a plurality of strands arranged in a tiered array and forming the strand package;
    a cavity in the end fitting, free ends of said plurality of strands extending through an opening in said end fitting and received in said cavity; and
    an essentially phosphorous-free copper-silver braze alloy joining said free ends of said plurality of strands to each other and to interior surfaces of said end fitting.

20. The brazed joint of claim 19 wherein said plurality of strands comprises all hollow strands.

* * * * *